US012625970B2

(12) United States Patent
Taylor

(10) Patent No.: US 12,625,970 B2
(45) Date of Patent: May 12, 2026

(54) PROVIDING BIOS FEATURES IN A PRE-BOOT ENVIRONMENT FOR A CLIENT COMPUTER SYSTEM

(71) Applicant: PHOENIX TECHNOLOGIES EMEA LIMITED, Dublin (IE)

(72) Inventor: Ken Taylor, Bellevue, WA (US)

(73) Assignee: Phoenix Technologies EMEA Limited, Dublin (IE)

( * ) Notice: Subject to any disclaimer, the term of this patent is extended or adjusted under 35 U.S.C. 154(b) by 73 days.

(21) Appl. No.: 18/843,898

(22) PCT Filed: Mar. 7, 2023

(86) PCT No.: PCT/US2023/014730
§ 371 (c)(1),
(2) Date: Sep. 4, 2024

(87) PCT Pub. No.: WO2023/172569
PCT Pub. Date: Sep. 14, 2023

(65) Prior Publication Data
US 2025/0190573 A1    Jun. 12, 2025

Related U.S. Application Data

(60) Provisional application No. 63/317,139, filed on Mar. 7, 2022.

(51) Int. Cl.
*G06F 21/57* (2013.01)
*G06F 9/4401* (2018.01)
(52) U.S. Cl.
CPC .......... *G06F 21/575* (2013.01); *G06F 9/4401* (2013.01)

(58) Field of Classification Search
CPC ............................... G06F 21/575; G06F 21/57
See application file for complete search history.

(56) References Cited

U.S. PATENT DOCUMENTS

| | | | | | |
|---|---|---|---|---|---|
| 6,189,100 | B1 * | 2/2001 | Barr | ...................... | G06F 21/575 |
| | | | | | 380/278 |
| 6,331,103 | B1 * | 12/2001 | Teraoka | ................ | F04C 29/061 |
| | | | | | 418/181 |
| 7,299,354 | B2 * | 11/2007 | Khanna | ................... | H04L 67/34 |
| | | | | | 713/168 |
| 8,726,258 | B2 | 5/2014 | Mortensen | | |
| 8,874,892 | B1 | 10/2014 | Chan et al. | | |
| 9,064,117 | B1 * | 6/2015 | Worsley | ................. | G06F 9/441 |
| 9,068,752 | B2 * | 6/2015 | Shaffer | ................... | F24C 3/103 |

(Continued)

OTHER PUBLICATIONS

PCT Written Opinion of the International Search Authority and International Search Report, Jun. 13, 2023, 6 pgs.

*Primary Examiner* — Hetul B Patel
(74) *Attorney, Agent, or Firm* — Saxton & Stump, LLC

(57) ABSTRACT

A Method And System For Providing Secure And Customized Bios Features Via Execution Requests In A Pre-boot Environment For A Client Computer System. The Bios Features Are Provided To The Client Computer System Utilizing Signed Certificates For Verifying A Command And Control Client As Validated Firmware, Verifying Enrollment Of The Command And Control Client And Verifying Execution Requests Prior To Execution Of Processes In The Execution Request. The Execution Of The Processes Results In The Customized Bios Features For The Client Computer System.

20 Claims, 5 Drawing Sheets

401 — Generating A Unique Session Identifier In A Pre-Boot Environment

403 — Combining An Execution Request With The Unique System Identifier, Optionally, The Unique Session Identifier, and The Administrator Key To Form The Signed Execution Request 405 — Saving The Signed Execution Request To The Hidden Boot Partition 407 — Authenticating The Signed Enrollment Package Stored In The Hidden Boot Partition With An Enrollment Authentication Key 409 — Upon Authenticating The Signed Enrollment Package, The Command And Control Client Receives The Signed Execution Request 411 — Authenticating the Signed Execution Request With The Administrator Key With The Command And Control Client 413 — Authenticating The Target Of The Execution Request With A Code Signing Key With The Command And Control Client 415 — Executing One Or More Processes Based On The Execution Request With The Command And Control Client

(56)     References Cited

U.S. PATENT DOCUMENTS

|  |  |  |  |  |
|---|---|---|---|---|
| 9,110,678 | B1 | 8/2015 | Chan et al. | |
| 10,140,452 | B2 * | 11/2018 | Silverstone | G06F 9/45558 |
| 10,262,309 | B1 | 4/2019 | Chan et al. | |
| 10,831,506 | B2 * | 11/2020 | Mortensen | G06F 9/5011 |
| 11,151,255 | B2 * | 10/2021 | Cho | G06F 21/572 |
| 11,461,485 | B2 | 10/2022 | Beecham | |
| 11,579,893 | B2 | 2/2023 | Chaiken et al. | |
| 2008/0052526 | A1 | 2/2008 | Dailey et al. | |
| 2009/0327741 | A1 * | 12/2009 | Zimmer | G06F 21/575 |
| | | | | 713/2 |
| 2011/0154006 | A1 | 6/2011 | Natu et al. | |
| 2012/0254602 | A1 | 10/2012 | Bhansali et al. | |
| 2014/0047243 | A1 | 2/2014 | Lo et al. | |
| 2017/0147801 | A1 | 5/2017 | Hamlin et al. | |
| 2019/0339988 | A1 * | 11/2019 | Liu | G06F 9/4416 |
| 2022/0171614 | A1 | 6/2022 | Wolnowski et al. | |
| 2022/0198018 | A1 | 6/2022 | Wentz et al. | |

* cited by examiner

201   Authenticating A Command And Control Client In A Hidden Boot Partition With A Firmware Key To Verify The Command And Control Client As Validated Firmware 203   Returning The Client Computer System To A Pre-Boot Environment And Generating A Unique System Identifier With The Command And Control Client

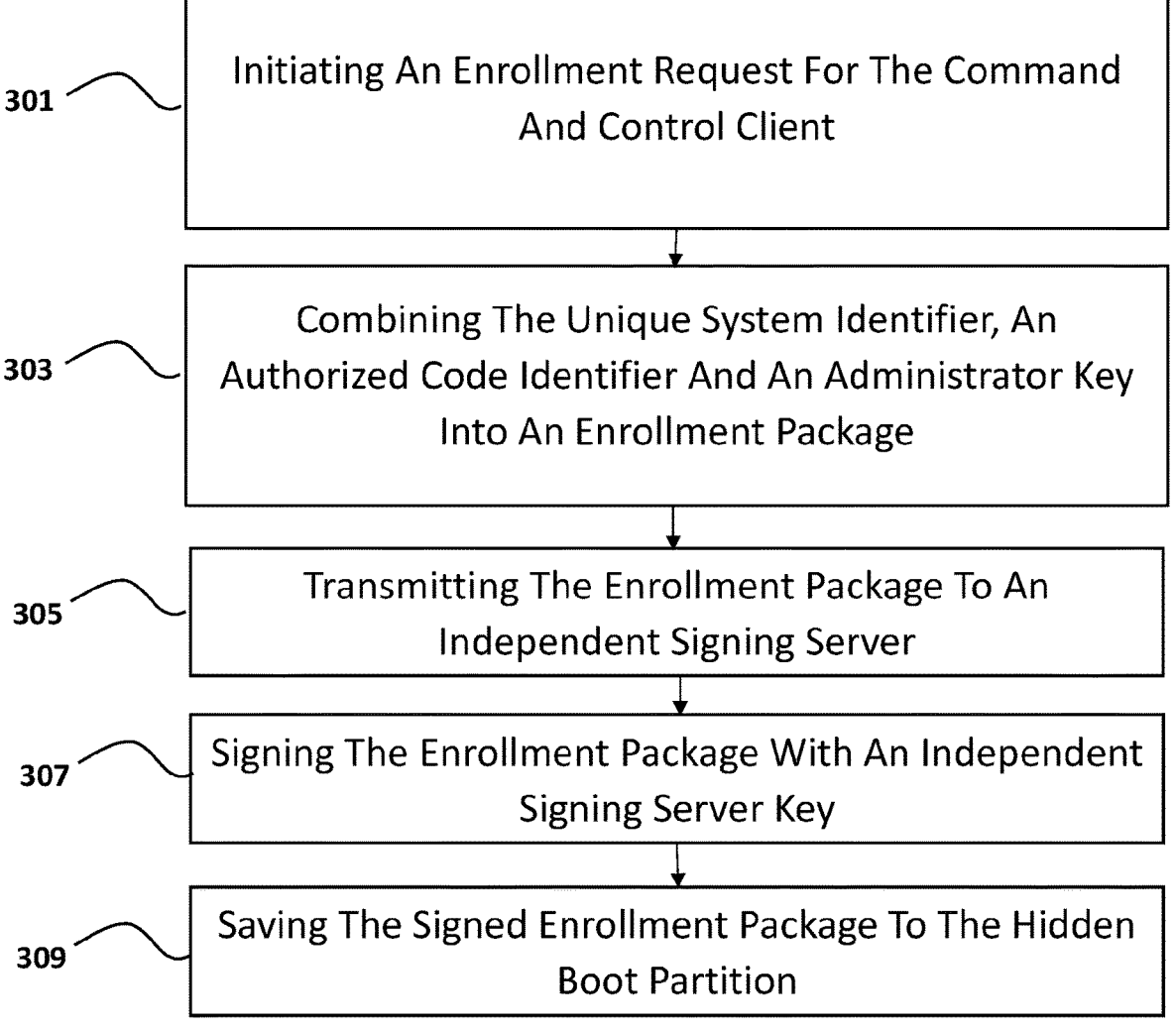

301 — Initiating An Enrollment Request For The Command And Control Client

303 — Combining The Unique System Identifier, An Authorized Code Identifier And An Administrator Key Into An Enrollment Package 305 — Transmitting The Enrollment Package To An Independent Signing Server 307 — Signing The Enrollment Package With An Independent Signing Server Key 309 — Saving The Signed Enrollment Package To The Hidden Boot Partition

FIG. 3

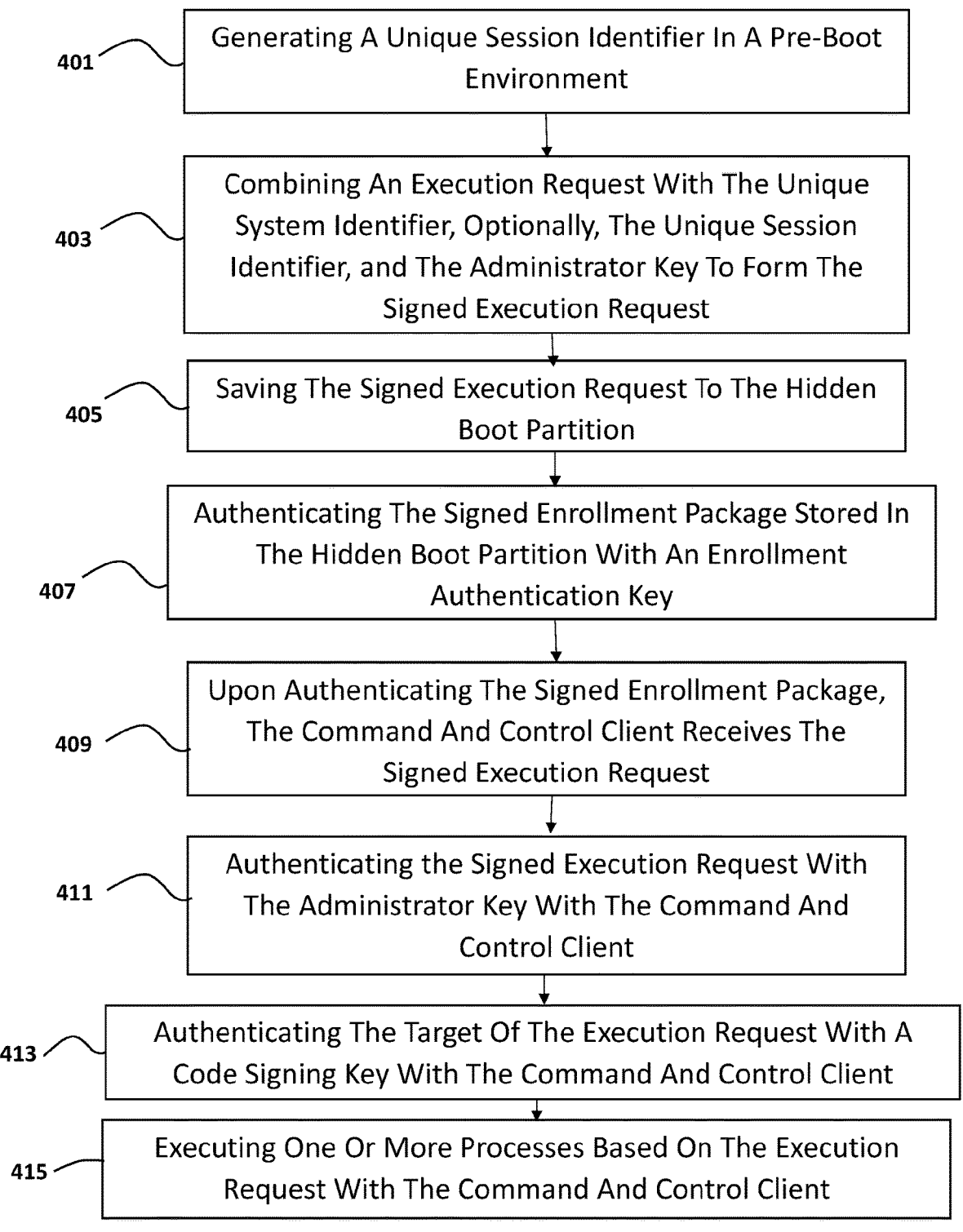

401 — Generating A Unique Session Identifier In A Pre-Boot Environment

403 — Combining An Execution Request With The Unique System Identifier, Optionally, The Unique Session Identifier, and The Administrator Key To Form The Signed Execution Request 405 — Saving The Signed Execution Request To The Hidden Boot Partition 407 — Authenticating The Signed Enrollment Package Stored In The Hidden Boot Partition With An Enrollment Authentication Key 409 — Upon Authenticating The Signed Enrollment Package, The Command And Control Client Receives The Signed Execution Request 411 — Authenticating the Signed Execution Request With The Administrator Key With The Command And Control Client 413 — Authenticating The Target Of The Execution Request With A Code Signing Key With The Command And Control Client 415 — Executing One Or More Processes Based On The Execution Request With The Command And Control Client

FIG. 4

PROVIDING BIOS FEATURES IN A PRE-BOOT ENVIRONMENT FOR A CLIENT COMPUTER SYSTEM

CROSS-REFERENCE TO RELATED APPLICATIONS

This application claims priority to U.S. Ser. No. 63/317,139, entitled "PHOENIX LAUNCHER" filed Mar. 7, 2022, the disclosure of which is incorporated herein by reference in its entirety.

FIELD OF THE INVENTION

Embodiments of the invention relate to providing BIOS features in a pre-boot environment for a client computer system.

BACKGROUND OF THE INVENTION

When a computer is powered on, the computer undergoes an initial set of operations to configure the hardware and software of the computer. This process is known as the boot process. BIOS code may execute prior to the initialization of an operating system (OS) of the information handling system. A Unified Extensible Firmware Interface (UEFI) standard has been developed by the Unified EFI Forum industry group to enhance the booting process of modern computer systems. However, not all problems in the boot process have been addressed by the UEFI standard and/or current techniques of the art.

Known basic input/output system (BIOS) have either limited features or features that are not easily changed. Likewise, system administrators lack the ability to administer features of BIOS or UEFI for their client systems. In addition, there are significant security concerns regarding placing and executing code in BIOS. In addition, network access within BIOS environment is problematic and dependent on, among other things, whether or not the required network drivers are installed by the OEM.

It is to be noted that various terms discussed herein (e.g., Secure Boot, etc.) are described, for example, in the UEFI Specification version 2.9, which was released in March 2021 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

What is needed is ability to provide BIOS features in a pre-boot environment that is secure and provides flexibility for administrators over an enterprise system. Other features and advantages will be made apparent from the present specification. The teachings disclosed extend to those embodiments that fall within the scope of the claims, regardless of whether they accomplish one or more of the aforementioned needs.

SUMMARY OF THE INVENTION

Embodiments of the present invention include a method and system for providing secure and customized BIOS features via execution requests in a pre-boot environment for a client computer system. The BIOS features are provided to the client computer system utilizing signed certificates for verifying a command and control client as validated firmware, verifying enrollment of the command and control client and verifying execution requests prior to execution of processes in the execution request. The execution of the processes results in the customized BIOS features for the client computer system.

One embodiment of the present invention includes, a non-transitory machine-readable storage medium storing one or more sequences of instructions for providing BIOS features in a pre-boot environment for a client computer system, which when executed by one or more processors, cause, authentication of a command and control client with a firmware key to verify the command and control client as validated firmware. The client computer system is caused to be returned to a pre-boot environment and to generate a unique system identifier with the command and control client. The instructions further cause initiation of an enrollment request for the command and control client. The initiating includes transmittal of the unique system identifier to an administrator server. The administrator server is caused to combine the unique system identifier, an authorized code identifier and an administrator key into an enrollment package. Transmittal is caused of the enrollment package to an independent signing server. The instructions further cause the enrollment package to be signed with an independent signing server key and the signed enrollment package is caused to be saved to the hidden boot partition.

Another embodiment of the present invention includes, a non-transitory machine-readable storage medium storing one or more sequences of instructions for providing BIOS features in a pre-boot environment for a client computer system, which when executed by one or more processors, cause, prior to loading any operating system on the client computer system, to generate a unique session identifier. The instructions further cause an execution request, the unique system identifier and the administrator key to be combined to form a signed execution request. The signed execution request is caused to be stored in the hidden boot partition of the client computer system. The signed enrollment package is caused to be authenticated in the hidden boot partition with an enrollment authentication key. Upon authenticating the signed enrollment package, the command and control client is caused to receive the signed execution request. The signed execution request is caused to be authenticated with the administrator key with the command and control client. The target of the signed execution request is caused to be authenticated with the code signing key with the command and control client. Upon authentication of the signed enrollment package, the authentication of the signed execution request and the authenticating of the target of the execution request, one or more processes are caused to be executed based on the execution request with the command and control client.

Another embodiment of the present invention includes a computer system including a client computer system comprising one or more processors, an administrator server; and an independent signing server for enrolling a command and control client. Each of the client computer system, the administrator server and the independent signing server includes one or more computer-readable storage mediums storing one or more sequences of instructions, which when executed, cause, authentication of the command and control client with a firmware key to verify the command and control client as validated firmware. The client computer system is caused to be returned to a pre-boot environment and to generate a unique system identifier with the command and control client. The instructions further cause initiation of an enrollment request for the command and control client.

The initiating includes transmittal of the unique system identifier to an administrator server. The administrator server is caused to combine the unique system identifier, an authorized code identifier and an administrator key into an enrollment package. Transmittal is caused of the enrollment package to an independent signing server. The instructions further cause the enrollment package to be signed with an independent signing server key and the signed enrollment package is caused to be saved to the hidden boot partition.

Another embodiment of the present invention includes a computer system including a client computer system comprising one or more processors, an administrator server; and an independent signing server for enrolling a command and control client. Each of the client computer system, the administrator server and the independent signing server includes one or more computer-readable storage mediums storing one or more sequences of instructions, which when executed, cause, prior to loading any operating system on the client computer system, to generate a unique session identifier. The instructions further cause an execution request, the unique system identifier and the administrator key to be combined to form a signed execution request. The signed execution request is caused to be stored in the hidden boot partition of the client computer system. The signed enrollment package is caused to be authenticated in the hidden boot partition with an enrollment authentication key. Upon authenticating the signed enrollment package, the command and control client is caused to receive the signed execution request. The signed execution request is caused to be authenticated with the administrator key with the command and control client. The target of the signed execution request is caused to be authenticated with the code signing key with the command and control client. Upon authentication of the signed enrollment package, the authentication of the signed execution request and the authenticating of the target of the execution request, one or more processes are caused to be executed based on the execution request with the command and control client.

Another embodiment of the present invention includes a method for providing BIOS features in a pre-boot environment for a client computer system. The method includes authenticating a command and control client with a firmware key to verify the command and control client as validated firmware. The client computer system is returned to a pre-boot environment and a unique system identifier is generated with the command and control client. An enrollment request is initiated for the command and control client. The initiation includes transmittal of the unique system identifier to an administrator server. The unique system identifier, an authorized code identifier and an administrator key are combined into an enrollment package. The enrollment package is transmitted to an independent signing server. The enrollment package is signed with an independent signing server key and the signed enrollment package is saved to the hidden boot partition.

Another embodiment of the present invention includes a method for providing BIOS features in a pre-boot environment for a client computer system. Prior to loading any operating system on the client computer system, generating a unique session identifier. An execution request, the unique system identifier and the administrator key are combined to form a signed execution request. The signed execution request is stored in the hidden boot partition of the client computer system. The signed enrollment package in the hidden boot partition is authenticated with an enrollment authentication key. Upon authenticating the signed enrollment package, the signed execution request is received with the command and control client. The signed execution request is authenticated with the administrator key with the command and control client. The target of the execution request is authenticated with the code signing key. Upon authentication of the signed enrollment package, the authentication of the signed execution request and the authenticating of the target of the execution request, one or more processes based on the execution request are executed with the command and control client.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Embodiments of the invention are illustrated by way of example, and not by way of limitation, in the figures of the accompanying drawings and in which like reference numerals refer to similar elements and in which:

FIG. 3 is a flowchart describing the high-level steps of enrolling the command and control client on the client computer system according to an embodiment of the present disclosure; and FIG. 4 is a flowchart describing the high-level steps of verifying execution requests for execution of processes according to an embodiment of the present disclosure according.

Wherever possible, the same reference numbers will be used throughout the drawings to represent the same parts.

DETAILED DESCRIPTION OF THE INVENTION

Approaches for providing BIOS features in a pre-boot environment for a client computer system are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Advantageous features of the present invention include, but are not limited to, the ability for an administrator to provide features to a client computer system remotely via an independent signing server. The features are identified by execution requests that are fetched by or pushed to the client computer system. To provide security, certificates signed by an independent signing server are utilized to authenticate the execution requests, which may be targeted at BIOS applications (such as instruct SecureWipe to erase a drive, or configure the system to boot to a USB drive). The authorization are tied to a specific device in a manner that prevents leaked credentials from being used on any arbitrary system In addition, the authorizations from the independent signing server and the signed certificates, in certain embodiments, are tied to a single session to avoid replay attacks.

Figure 1:
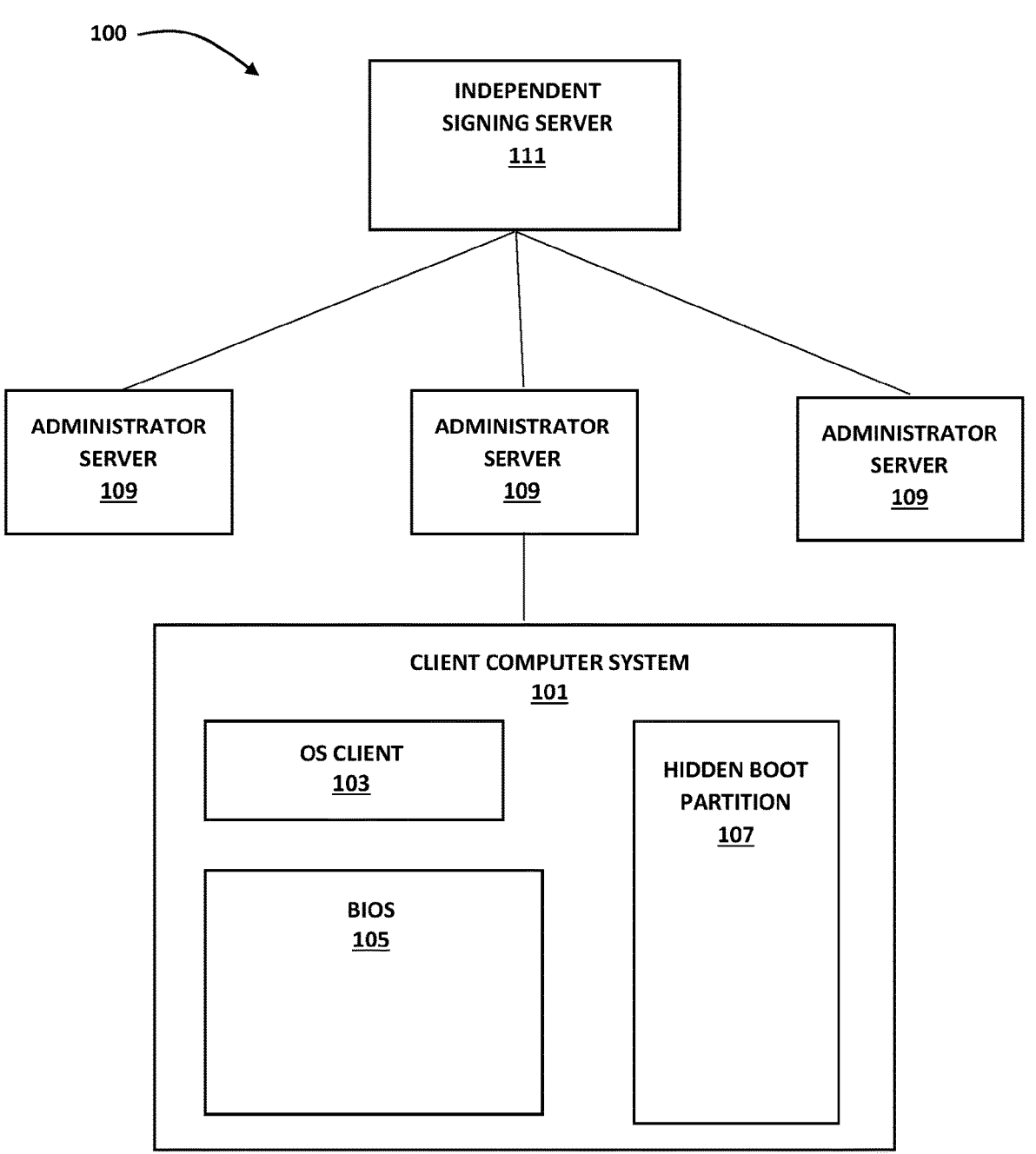
FIG. 1 is a block diagram of the functional components of an illustrative computer system according to an embodiment of the present disclosure.

FIG. 1 shows a BIOS configuration system 100 according to an embodiment of the present disclosure configured for providing BIOS features in a pre-boot environment for a client computer system 101. The client computer system 101 includes one or more processors and volatile and persistent storage to run various clients. The client computer system 101 may correspond to any computer system which is capable of executing basic input/output system (BIOS) 105. BIOS 105, as broadly used herein, refers to any basic input/output system (BIOS) that is designed to be the boot firmware for client computer system 101 when client computer system 101 is powered on. In an embodiment, BIOS 105 includes or corresponds to Unified Extensible Firmware Interface (UEFI) Platform Firmware. Non-limiting, illustrative examples of client computer system 101 include a personal computer (PC), a laptop, a tablet computer, a server, a router, a personal digital assistant (PDA), a cell phone, and a game system. The client computer system 101 includes a hidden boot partition 107, which is persistent storage that may be used to extend BIOS functionality. For example, optional BIOS drivers may be placed in the hidden boot partition 107 to support unique hardware configurations.

The system 100 further includes one or more administrator servers 109 also including one or more processors for providing a execution request to provide BIOS features in a pre-boot environment. The administrator servers 109 may include applications and interfaces that allow an administrator to specify actions that may be taken in a BIOS context such as adding features that extend the BIOS functionality, wiping hard drives, and changing BIOS configuration parameters. The system 100 also includes an independent signing server 111 for authorizing the use of features on an ala carte basis.

Each of the client computer system 101, the administrator server 109 and the independent signing server 111 include one or more computer-readable storage mediums storing one or more sequences of instructions that, when executed, provide the BIOS features to the client computer system 101 through an exchange of certificates and selective implementation of the hidden boot partition 107 of the client computer system 101 and the UEFI BDS Phase 105. The BIOS configuration system 100 utilizes OS Client 103 to obtain instructions from a user to initiate installation of a command and control client. The command and control client may be, for example, a Phoenix Launcher or Launcher.

Figure 2:
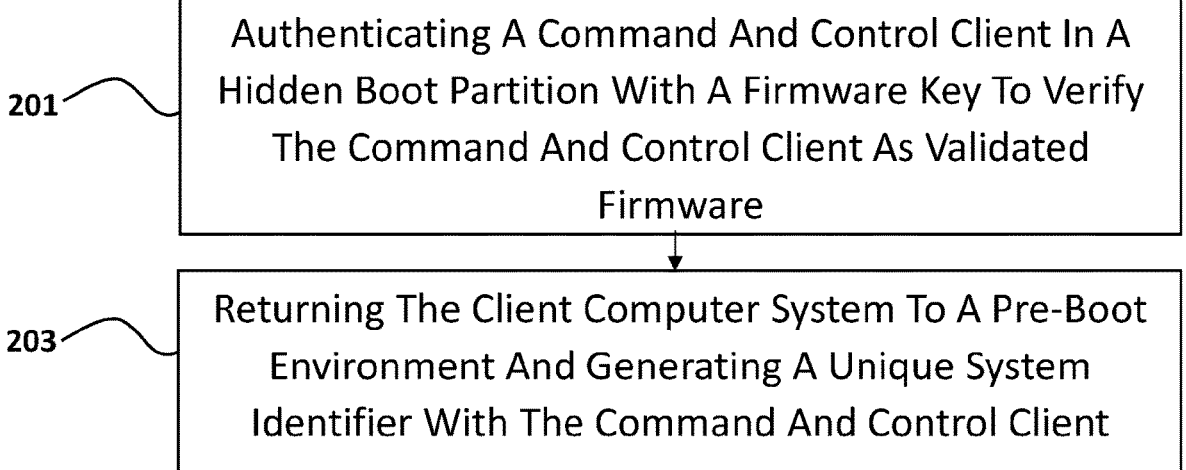
FIG. 2 is a flowchart describing the high-level steps of installing and enrolling the command and control client on the client computer system according to an embodiment of the present disclosure.

The process flow illustrated in FIG. 2 shows installing the command and control client on the client computer system 101 according to an embodiment of the present disclosure. As shown in the process flow illustrated in FIG. 2, the client computer system 101 authenticates the command and control client in the hidden boot partition 107 with a firmware key to verify the command and control client as validated firmware (step 201). The verification of the command and control client is provided according to the known UEFI Standard (e.g., UEFI Specification version 2.9, which was released in March 2021). For example, the firmware validation of the command and control client may be provided by Secure Boot. In one example, the firmware key may be, for example, a private key of an original equipment manufacturer (OEM), a platform entity, an OS developer or other entity that may desire to verify that a device only boots using software that is trusted.

After authenticating the command and control client the client computer system 101 is returned to a pre-boot environment and generating a unique system identifier with the command and control client (step 203). The unique system identifier may be any number, codes, algorithm or other unique identifier that, when generated is identifiable to a particular system. The unique system identifier may be, for example, a universally unique identifier (UUID) or system identifier. For example, a unique system identifier may be generated as a hash of SMBIOS data that identifies a system and a random number that is stored in a UEFI boot only variable where it is inaccessible to the OS. In addition to returning to the pre-boot environment and generating the unique system identifier, the command and control client changes the boot order in the BIOS so that the command and control client is booted first upon booting of the client computer system 101.

The process flow illustrated in FIG. 3 shows a process for enrolling the command and control client on the client computer system 101 according to an embodiment of the present disclosure. As shown in the process flow illustrated in FIG. 3, an enrollment request for the command and control client is initiated (step 301). The enrollment request may be initiated by the administrator server 109, the OS Client 103 or from elsewhere in system 100. The initiation includes transmittal of the unique system identifier to an administrator server 109. The administrator server 109 may be, for example, a customer server. The administrator server 109 combines the unique system identifier, an authorized code identifier and an administrator key into an enrollment package (step 303). For example, the unique system identifier may be a random number generated by the command and control client to identify a particular client computer system 101. In one embodiment of the present disclosure, the unique identifier is generated one time and is not altered even after rebooting of the system. The authorized code identifier is a listing, code, number or other identifier that is able to provide instructions on what processes are authorized to be run by the command and control client. The authorized code identifier may, for example, include a globally unique identifier (GUID). The administrator key is a public key provided by the administrator server 109 that is capable of verifying instructions signed by the administrator server 109, for example, with an administrator private key. The administrator key may, for example, be a customer key.

After the enrollment package is formed, the enrollment package is transmitted to an independent signing server 111 (step 305). The independent signing server 111 may be, for example, a Phoenix server or other server associated with a software provider. The independent signing server 111 signs the enrollment package with an independent signing server key (step 307). The enrollment package may, for example, include the enrollment payload. The independent signing server key may be a private key specific to the independent signing server 111. For example, the independent signing server kay may be a Phoenix provisioning key.

After the enrollment package is signed, the signed enrollment package is saved to the hidden boot partition 107 of the client computer system 101 (step 309). The saving of the signed enrollment package may be accomplished by the OS client 103, the command and control client, the administrator server 109 or via any other suitable component or code.

The process flow illustrated in FIG. 4 shows a process for verifying execution requests for execution of processes on client computer system 101 according to an embodiment of the present disclosure. As shown in the process flow illustrated in FIG. 4, a unique session identifier is generated in a pre-boot environment (step 401). The unique session identifier may be any suitable number, code, instruction or other identifier that is unique to the session. For example, the unique session identifier may be a nonce. The method further includes combining an execution request with the unique system identifier and, optionally, the unique session identifier, and the administrator key to form the signed execution request (step 403). The execution request including instructions to execute one or more processes. The execution request includes code or identifying information corresponding to or identifying BIOS features for, if verified, ultimate execution on the client computer system 101. For example, the execution request may include instructions for drive deletion and/or formatting, code to provide configuration of UEFI, and code to provide boot time authorization certifying or verifying chain of trust for a device, installing a program to provide real-time system health monitoring of a device, installing automated code updates to firmware, installing signed automated updates to firmware, installing code that locks storage devices from changes of state or data, or installing code for to allow or require multifactor authentication. For code validating a device's chain of trust, such code can be initiated directly by an administrator's command, or at scheduled time intervals as defined by an administrator's predetermined or discretionary policies. Additional features may include booting over the network, remote selection of alternate operating systems, direct scanning of Firmware for malware, and other suitable BIOS features. For code updates made by an execution request, such updates may be made under NIST 800-147 and SP 800-193 guidelines, which are incorporated by reference to this application, or similar guidelines known in the art. The execution requests are instructions to implement processes, such as binary processes, present on the client computer system 101. In one embodiment, the execution request is plain text, having features and properties similar to or identical to a batch file. For example, the execution request may be a human readable file that contains the instruction for an execution request. In addition, in certain embodiments, the unique session identifier may also be omitted from the signed execution request in the event that the execution request includes a process that is persistent between boot sessions. The method further includes saving the signed execution request to the hidden boot partition 107. After saving the signed execution request, the signed enrollment package stored in the hidden boot partition 107 is authenticated with an enrollment authentication key (step 407). The enrollment authentication key is a key, which may be public key, that verifies the enrollment of the command and control client and that the enrollment is associated with the independent signing server 111 (see also FIG. 3). The enrollment authentication key may be, for example, a Phoenix key. In one embodiment, the enrollment authentication key is the public key of a public/private key pair, corresponding to the private, independent signing server key. The enrollment authentication key may have been transmitted with the signed enrollment package or may be pre-installed in the trust stores or hidden boot partition 107 of the client computer systems 101.

Upon authenticating the signed enrollment package, the command and control client receives the signed execution request (step 409). By receives, and its grammatical variations, as utilized here, it is meant that the command and control client is able to interact with the signed execution request, which may be facilitated by access or transmission of the signed execution request. The signed execution request is authenticated with the administrator key with the command and control client (step 411). In this step, the signed execution request is authenticated such that the instructions are verified as instructions approved by the administrator. In addition, the target of the execution request is authenticated with a code signing key with the command and control client (step 413). In this step, the code for executing the process targeted by the execution request is authenticated to verify that the instructions are authorized processes. For example, the authorization verifies that the code that is executed with the execution request is a process that was included in the authorized code identifier in the enrollment package. For example, the authentication may take place when the boot process in the boot device selection (BDS) phase of the booting process. Once the signed execution request and the execution request are authenticated, the command and control client then executes the one or more processes based on the execution request (step 415). The signed binary code (i.e., the code corresponding to the process that is the target of the execution request) that implements command found in the execution request is the code that implements the process. The signed binary code is authenticated/signed by the code signing key. Execution of the processes may include for example, drive deletion and/or formatting, configuration of UEFI, and boot time authorization. In other embodiments, the process may include code to boot over the network, remote select alternate operating systems, direct scan for Firmware for malware or other processes desirable to execute as a beneficial BIOS feature. In one embodiment, the processes executed at step 415 are implemented by a bundle of code for which the signature was checked at step 413, based on simple instructions delivered through the signed execution request.

The authentication and/or verification of the command and control client, the enrollment package, the execution request, and the signed execution request may be accomplished utilizing certificates and algorithms, such as Code-Signing. Code-Signing, in one embodiment, is the process of digitally signing executable and scripts to confirm the software author and guarantee that the code has not been altered or corrupted since it was signed. That is, the software (sometimes referred to as, "computer code") is digitally signed using an asymmetric private key and the code signature is verified using the corresponding asymmetric public key encapsulated within a code-sign certificate (also referred to as "a digital certificate", "a public key certificate" or "an identity certificate"), which is an electronic document used to prove the ownership of a public key.

The certificates are signed utilizing a public/private key pair provided by the software developer and provides the public key and the developer's identity information to a trustworthy certificate authority. For example, in the instance of the enrollment package (see FIG. 3), the enrollment package is signed by an independent signing server 111 with an independent signing server key, which may be a private key associated only with that independent signing server 111. The signing of the enrollment package with independent signing server encodes the enrollment package to form a signed enrollment package that establishes or authenticates ownership of the command and control client, permitting the command and control client to execute code or processes authorized in the authorized code identifier.

To establish the authentication, the server (or other entity) signs the code (e.g., the enrollment package and the signed execution request) by hashing the code to create a hash value and encrypting the hash value using the developer's private key to create a digital signature, which the developer then attaches (e.g., appends, links, embeds, etc.) to the code. These operations generally constitute the code signing process.

The public key may be transmitted with the code or may be pre-installed in the trust stores or hidden boot partition 107 of the client computer systems 101, such that when code is downloaded, the OS Client 103 or command and control client retrieves the corresponding public key for the developer of authenticator of the code to first verify the authenticity of the code signing certificate that is sent with or embedded in the signed software to confirm that the software is from a trustworthy source. After verifying the authenticity of the code signing certificate, the OS Client 103 or command and control client retrieves the corresponding public key from the certificate and uses it to decrypt the digital signature to recover the hash value of the code. The client device then hashes the code that it receives from the developer to create a hash value, and compares the hash value to the recovered hash value. If the hash values match, then the code is authenticated and the software is as the developer last left it, and the code is safe to install and/or execute.

In one embodiment, the enrollment package and the request package may, for example, be a token, such as a JSON web token (JWT). A JWT is a compact and self-contained way of securely transmitting data over non-secure networks using digital signature that may be signed using a secret or a public/private key pair. A JWT is a three-part data structure comprising a header, payload, and signature in a specific format (i.e., xxxx.yyyy.zzzz). When tokens are signed using public/private key pairs, the signature also certifies that only the party holding the private key is the one that signed it. For user authentication, once the user is logged in, each subsequent request will include the JWT, allowing the user to access network resources that are permitted with that token. Although embodiments are described with respect to use of JSON web tokens, embodiments are not so limited, and any other similar token using digital signatures such as public/private keys, and with or without encryption, may be used. Like other certificates, verifying those tokens grant access using public/private key pair. The system uses the public key assigned to the directory object with a private key that is retained by developer.

The JWT may, for example, include an execution request to define any relevant operation that may be performed by the BIOS 105, such as drive deletion and/or formatting, configuration of UEFI, and boot time authorization. Additional operations may include booting over the network, remote selection of alternate operating systems, direct scanning of Firmware for malware, and other suitable BIOS features. The JWT certificate thus defines the operation to be performed, expiry time, and it also carries the appropriate authentication information.

Figure 5:
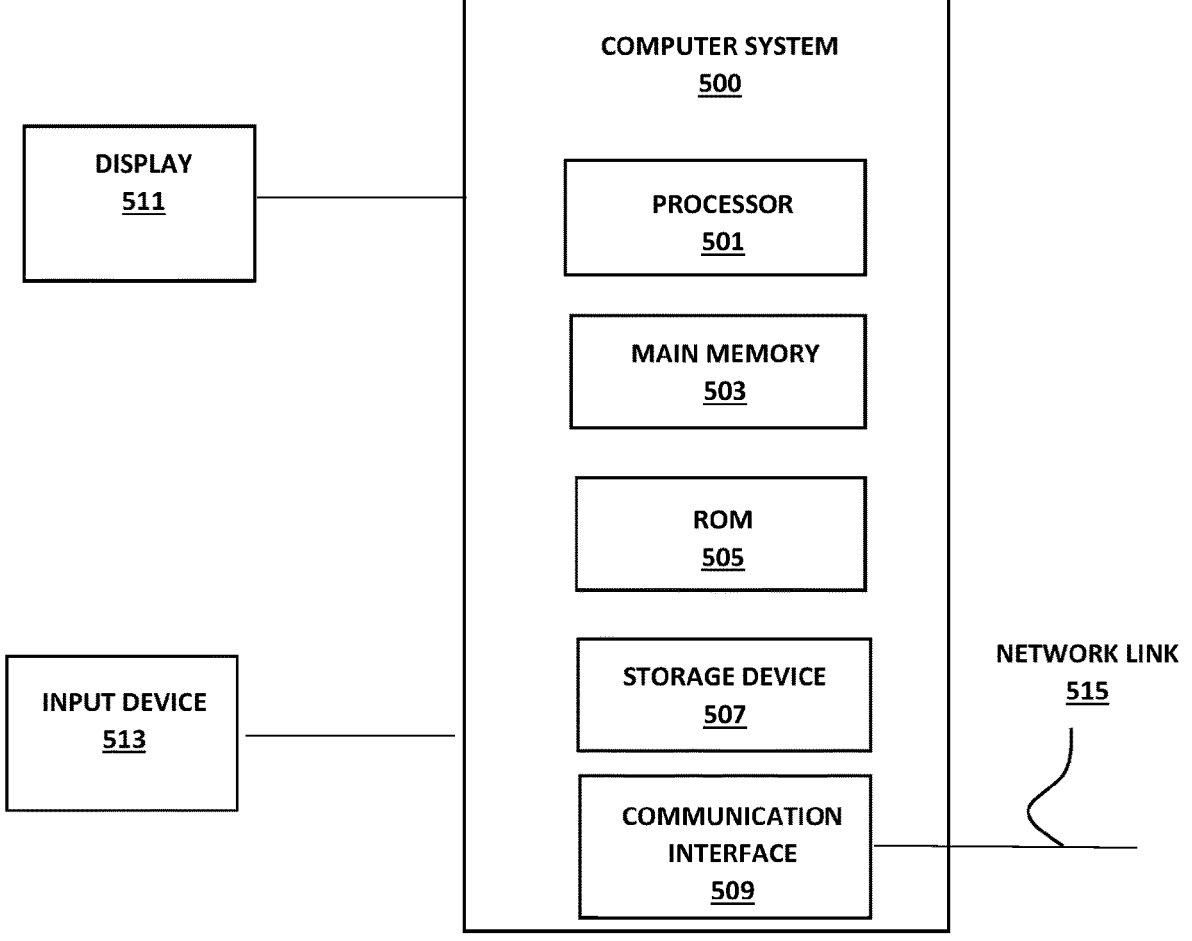
FIG. 5 is a block diagram that illustrates the hardware components of a computer system upon which an embodiment of the present disclosure may be implemented.

FIG. 5 is a block diagram that illustrates a computer system 500 upon which an embodiment of the invention may be implemented. Computer system 500 may be, for example, a desktop computer, laptop computer, tablet computer, MP3 player, personal data assistant (PDA), cell phone, etc. as it may be configured according to one embodiment of the present disclosure. In this regard, it should be understood that the configuration of FIG. 5 is exemplary only, and that the disclosed methods may be implemented on other types of information handling systems.

One of more of client computer system 101, administrator server 109 and independent signing server 111 may be implemented on a computer system 500. In an embodiment, computer system 500 includes processor 501, main memory 503, ROM 505, storage device 507, and communication interface 509. Computer system 500 includes at least one processor 501 for processing information. Processor 501 may include any type of processing device, such as an Intel processor, an Advanced Micro Devices (AMD) processor or another processing device. Processor 501 may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 501 may be a multi-core processor or an array (e.g., one or more) of processors. Processor 501 is coupled to main memory 503, which may include, for example, random access memory (RAM), dynamic RAM (DRAM), synchronous DRAM (SDRAM), for storing information and instructions to be executed by processor 501. Main memory 503 also may be used for storing temporary variables or other intermediate information during execution of instructions to be executed by processor 501. Computer system 500 further includes a read only memory (ROM) 505 or other static storage device for storing static information and instructions for processor 501. A storage device 507, such as a magnetic disk or optical disk, is provided for storing information and instructions. The main memory 503, ROM 505 and the storage device 507 store programming logic (e.g., instructions/code) that, when executed by the processor 501, controls the operations of the computer system 500. The instructions include code from any suitable computer programming language such as, but not limited to, C, C++, C#, Java, JavaScript, VBScript, Perl, HTML, XML, Python, TCL, and Basic.

BIOS 105 (e.g., BIOS firmware) may reside in the ROM 505, which may be a flash memory device. An additional and separate supplemental BIOS component may be stored separately from BIOS 105 as hidden boot partition 107 on non-volatile storage device/s such as storage device 507. For example, the client computer system 101, in the embodiment of FIG. 1, includes a separate supplemental BIOS component, hidden boot partition 107, wherein data is stored on storage device 507 (e.g., hard disk drive, solid-state drive, etc.).

Computer system 500 may be coupled to a display 511, which is any suitable display, such as a light emitting diode (LED) monitor, organic light emitting diode (OLED) monitor, cathode ray tube (CRT), a liquid quartz display (LCD) monitor, or any other device for displaying information to a user. An input device 513, including alphanumeric and other keys, is coupled to computer system 500 for communicating information and command selections to processor 501. Other non-limiting, illustrative examples of input device 513 include keyboard, mouse, touchpad, touchscreen or other input device for communicating direction information and command selections to processor 304 and for controlling cursor movement on display 511. While only one input device 513 is depicted in FIG. 5, embodiments of the invention may include any number of input devices 513 coupled to computer system 500.

Embodiments of the invention are related to the use of computer system 500 for implementing the techniques described herein. According to one embodiment of the invention, those techniques are performed by computer system 500 in response to processor 501 executing one or more sequences of one or more instructions contained in main memory 503. Such instructions may be read into main memory 503 from another machine-readable medium, such as storage device 507. Execution of the sequences of instructions contained in main memory 503 causes processor 501 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 501 for execution. Such a medium may take many forms, including but not limited to, non-volatile media and volatile media. Non-volatile media includes, for example, optical or magnetic disks, such as storage device 507. Volatile media includes dynamic memory, such as main memory 503. Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 501 for execution. For example, the instructions may initially be carried on a magnetic disk of a remote computer. The remote computer can load the instructions into its dynamic memory and send the instructions over a network link 515 to computer system 500.

Communication interface 509 provides a two-way data communication coupling to a network link 515 that is connected to a local network. For example, network interface may include a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. For example, communication interface 509 may be an integrated services digital network (ISDN) card or a modem to provide a data communication connection to a corresponding type of data line. As another example, communication interface 515 may be a local area network (LAN) card to provide a data communication connection to a compatible LAN. Wireless links, such as but not limited to a Bluetooth and/or 3G/4G/5G connection, may also be implemented. In any such implementation, communication interface 509 sends and receives electrical, electromagnetic or optical signals that carry digital data streams representing various types of information.

Network link 515 typically provides data communication through one or more networks to other data devices. For example, network link 515 may provide a connection through a local network to a host computer or to data equipment operated by an Internet Service Provider (ISP). The network link 515 may be connected to a local area network (LAN), a wide area network (WAN), a personal area network (PAN), or a combination of these or other networks, that interconnect the computing devices (as discussed herein) and/or databases. Although not illustrated, in many arrangements, the network link 515 and the communication interface 509 may comprise one or more intermediary devices, including gateways, routers, firewalls, switches, network accelerators, Wi-Fi access points or hotspots, or other devices. Any of the computing devices and/or the network link 515 may be configured to support any application layer protocol, including without limitation, Transport Layer Security (TLS), Hypertext Transfer Protocol (HTTP), File Transfer Protocol (FTP), and Secure Shell (SSH).

Computer system 500 can send messages and receive data, including program code, through the network(s), network link 515 and communication interface 509. For example, a server might transmit a requested code for an application program through the Internet, a local ISP, a local network, subsequently to communication interface 509. The received code may be executed by processor 501 as it is received, and/or stored in storage device 507, or other non-volatile storage for later execution.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A non-transitory machine-readable storage medium storing one or more sequences of instructions for providing BIOS features in a pre-boot environment for a client computer system, which when executed by one or more processors, cause:

authentication of a command and control client with a firmware key to verify the command and control client as validated firmware, the client computer system to be returned to a pre-boot environment and to generate a unique system identifier with the command and control client;

initiation of an enrollment request for the command and control client, the initiating including transmittal of the unique system identifier to an administrator server;

the administrator server to combine the unique system identifier, an authorized code identifier and an administrator key into an enrollment package;

transmittal of the enrollment package to an independent signing server;

the enrollment package to be signed with an independent signing server key; and the signed enrollment package to be saved to the hidden boot partition.

2. The non-transitory machine-readable storage medium of claim 1, wherein execution of the one or more sequences of instructions further cause:

prior to loading any operating system on the client computer system, to generate a unique session identifier;

an execution request, the unique system identifier and the administrator key to be combined to form a signed execution request;

the signed execution request to be stored in the hidden boot partition of the client computer system;

the signed enrollment package to be authenticated in the hidden boot partition with an enrollment authentication key;

upon authenticating the signed enrollment package, the command and control client to receive the signed execution request;

the signed execution request to be authenticated with the administrator key with the command and control client;

the target of the signed execution request to be authenticated with the code signing key with the command and control client; and upon authentication of the signed enrollment package, the authentication of the signed execution request and the authenticating of the target of the execution request, one or more processes to be executed based on the execution request with the command and control client.

3. The non-transitory machine-readable storage medium of claim 2, wherein execution of the one or more processes further cause:

upon completion of the executing the one or more processes, removal of the signed execution request from the hidden boot partition.

4. The non-transitory machine-readable storage medium of claim 2, wherein the firmware key and independent signing server key are private keys.

5. The non-transitory machine-readable storage medium of claim 2, wherein the hidden boot partition is a UEFI boot partition.

6. The non-transitory machine-readable storage medium of claim 2, wherein the enrollment package and the signed execution request include a JSON web token (JWT).

7. The non-transitory machine-readable storage medium of claim 2, wherein authenticating the signed enrollment package includes encrypting the signed enrollment package with the independent signing server key generated by the independent signing server.

8. The non-transitory machine-readable storage medium of claim 2, wherein one or more processes include code to provide drive deletion and/or formatting, code to provide configuration of UEFI, and code to provide boot time authorization.

9. The non-transitory machine-readable storage medium of claim 2, wherein the signed execution request further includes a unique session identifier.

10. A method for providing BIOS features in a pre-boot environment for a client computer system, comprising:

authenticating a command and control client with a firmware key to verify the command and control client as validated firmware, returning the client computer system to a pre-boot environment and generating a unique system identifier with the command and control client;

initiating an enrollment request for the command and control client, the initiating including transmittal of the unique system identifier to an administrator server;

combining the unique system identifier, an authorized code identifier and an administrator key into an enrollment package;

transmitting the enrollment package to an independent signing server;

signing the enrollment package with an independent signing server key; and saving the signed enrollment package to the hidden boot partition.

11. The method of claim 10, further comprising:

prior to loading any operating system on the client computer system, generating a unique session identifier;

combining an execution request, the unique system identifier and the administrator key to form a signed execution request;

storing the signed execution request in the hidden boot partition of the client computer system;

authenticating the signed enrollment package in the hidden boot partition with an enrollment authentication key;

upon authenticating the signed enrollment package, receiving the signed execution request with the command and control client;

authenticating the signed execution request with the administrator key with the command and control client;

authenticating the target of the signed execution request with the code signing key with the command and control client; and upon authentication of the signed enrollment package, the authentication of the signed execution request and the authenticating of the target of the execution request, executing one or more processes based on the execution request with the command and control client.

12. The method of claim 11, wherein execution of the one or more sequences of instructions further cause:

upon completion of the executing the one or more processes, removing the signed execution request from the hidden boot partition.

13. The method of claim 11, wherein the firmware key and independent signing server key are private keys.

14. The method of claim 11, wherein the hidden boot partition is a UEFI boot partition.

15. The method of claim 11, wherein the enrollment package and the signed execution request include a JSON web token (JWT).

16. The method of claim 11, wherein authenticating the signed enrollment package includes encrypting the signed enrollment package with the independent signing server key generated by the independent signing server.

17. The method of claim 11, wherein one or more processes include code to provide drive deletion and/or formatting, code to provide configuration of UEFI, and code to provide boot time authorization.

18. The method of claim 11, wherein the signed execution request further includes a unique session identifier.

19. A computer system configured for providing BIOS features in a pre-boot environment for a client computer system, comprising:

a client computer system comprising one or more processors;

an administrator server;

an independent signing server for enrolling a command and control client;

one or more computer-readable storage mediums storing one or more sequences of instructions, which when executed, cause:

authentication of the command and control client with a firmware key to verify the command and control client as validated firmware, the client computer system to be returned to a pre-boot environment and to generate a unique system identifier with the command and control client;

initiation of an execution request for the command and control client, the initiating including transmittal of the unique system identifier to an administrator server;

the administrator server to combine the unique system identifier, an authorized code identifier and an administrator key into an enrollment package;

transmittal of the enrollment package to an independent signing server;

the enrollment package to be signed with an independent signing server key; and the signed enrollment package to be saved to the hidden boot partition.

20. The computer system of claim 19, wherein execution of the one or more sequences of instructions further cause:

prior to loading any operating system on the client computer system, to generate a unique session identifier;

an execution request, the unique system identifier and the administrator key to be combined to form a signed execution request;

the signed execution request to be stored in the hidden boot partition of the client computer system;

the signed enrollment package to be authenticated in the hidden boot partition with an enrollment authentication key;

upon authenticating the signed enrollment package, the command and control client to receive the signed execution request;

upon authentication of the signed enrollment package, the authentication of the signed execution request and the authenticating of the target of the execution request, the signed execution request to be authenticated with the administrator key with the command and control client;

the target of the signed execution request to be authenticated with the code signing key with the command and control client; and one or more processes to be executed based on the execution request with the command and control client.

* * * * *